US010929151B2

(12) United States Patent
Horst et al.

(10) Patent No.: US 10,929,151 B2
(45) Date of Patent: Feb. 23, 2021

(54) COMPUTER-IMPLEMENTED METHOD FOR REPLACING A DATA STRING BY A PLACEHOLDER

(71) Applicant: Comforte AG, Wiesbaden (DE)

(72) Inventors: Michael Horst, Wuthenow (DE); Henning Horst, Zaisertshofen (DE)

(73) Assignee: COMFORTE AG, Wiesbaden (DE)

( * ) Notice: Subject to any disclaimer, the term of this patent is extended or adjusted under 35 U.S.C. 154(b) by 79 days.

(21) Appl. No.: 16/158,452

(22) Filed: Oct. 12, 2018

(65) Prior Publication Data

US 2019/0138326 A1 May 9, 2019

(30) Foreign Application Priority Data

Nov. 7, 2017 (DE) ...................... 10 2017 125 930.9

(51) Int. Cl.
*G06F 9/445* (2018.01)
*H04L 29/06* (2006.01)
(Continued)

(52) U.S. Cl.
CPC ...... *G06F 9/44505* (2013.01); *G06F 21/6245* (2013.01); *G06Q 20/382* (2013.01); *H04L 63/0471* (2013.01)

(58) Field of Classification Search
CPC ............. G06F 16/2379; G06F 21/6245; H04L 63/0471; G06Q 20/382
See application file for complete search history.

(56) References Cited

U.S. PATENT DOCUMENTS 8,595,850 B2 11/2013 Spies et al.
8,739,262 B2 5/2014 Harper et al.
(Continued)

FOREIGN PATENT DOCUMENTS

EP 2735991 B1 5/2014

OTHER PUBLICATIONS

Extended European Search Report, European Patent Office, dated Jan. 7, 2019, European Patent Application No. EP18203307.
(Continued)

*Primary Examiner* — Glenn A. Auve
(74) *Attorney, Agent, or Firm* — Paul & Paul

(57) ABSTRACT

The present invention relates to a computer-implemented method for replacing a data string by a placeholder in a replacement device and, when necessary, for reconstituting the data string from the placeholder in the replacement device. There is a need for a central system for replacing a data string by a placeholder for a whole company which enables all applications to be protected and, when necessary, to have controlled access to sensitive data strings. It is necessary to make possible a central administration but at the same time to offer application-related access points throughout the company without long network communication paths. It is therefore proposed according to the invention that the replacement device comprises a plurality of nodes of a distributed system carrying out the replacement, a management device connected to the nodes stores all the configuration data of the nodes necessary for the initialization of the nodes, at least one node is initialized centrally with the configuration data provided by the management device and the nodes do not permanently store the configuration data so that all the configuration data previously present on the node are deleted in the case of a shutdown or a failure of a node, wherein the method for replacing the data string by the placeholder has the steps: reception of the data string from an application, selection of at least one node carrying out the replacement from the plurality of nodes of the distributed system, onward transmission of the data string to the at least one selected node, generation of a placeholder replacing the data string in the at least one selected node and passing the placeholder to the application.

13 Claims, 6 Drawing Sheets

(51) Int. Cl.
*G06F 21/62* (2013.01)
*G06Q 20/38* (2012.01)

(56) References Cited

U.S. PATENT DOCUMENTS

| | | | |
|---|---|---|---|
| 8,745,094 | B2 | 6/2014 | Mattsson |
| 8,769,613 | B2 | 7/2014 | Latchem et al. |
| 9,219,716 | B2 | 11/2015 | Mattsson |
| 9,237,006 | B2 | 1/2016 | Mattsson et al. |
| 9,639,716 | B2 | 5/2017 | Mattsson |
| 2008/0263645 | A1 | 10/2008 | Renter et al. |
| 2009/0037553 | A1 | 2/2009 | Yuan et al. |
| 2010/0284532 | A1* | 11/2010 | Burnett ............... H04L 9/0816 380/28 |
| 2010/0293143 | A1 | 11/2010 | Jayaraman et al. |
| 2011/0154466 | A1* | 6/2011 | Harper ............... G06F 21/335 726/9 |
| 2011/0213807 | A1* | 9/2011 | Mattsson ............. G07F 7/084 707/802 |
| 2012/0023066 | A1 | 1/2012 | Bourbonnais et al. |
| 2012/0066769 | A1* | 3/2012 | Latchem ............. G06F 21/6245 726/26 |
| 2013/0198851 | A1* | 8/2013 | Spies ................... H04L 9/0625 726/26 |
| 2014/0032419 | A1* | 1/2014 | Anderson .......... G06Q 20/3672 705/78 |
| 2014/0150086 | A1* | 5/2014 | Horst .................. H04L 63/0471 726/18 |
| 2018/0276401 | A1* | 9/2018 | Allen .................. G06F 21/6245 |
| 2020/0074109 | A1* | 3/2020 | Pieniazek ............ G06F 16/903 |

OTHER PUBLICATIONS

Microsoft Corporation, https://docs.microsoft.com/en-us/windows/security/threat-protection/security-policy-settings/shutdown-clear-virtual-memory-pagefile, "Shutdown: Clear virtual memory pagefile," Jul. 31, 2017, downloaded Dec. 27, 2018.
European Patent Office, Office Action, dated Apr. 28, 2020, European Application No. 18 203 307.6.

\* cited by examiner

COMPUTER-IMPLEMENTED METHOD FOR REPLACING A DATA STRING BY A PLACEHOLDER

CROSS-REFERENCE TO RELATED APPLICATION

This application claims the priority of German Application No. 10 2017 125 930.9, filed on Nov. 7, 2017.

The present invention relates to a computer-implemented method for replacing a data string by a placeholder in a replacement device and, when necessary, for reconstituting the data string from the placeholder in the replacement device.

Systems in which a payment processor uses a network, in particular the Internet, to connect a large number of sales outlets and cash machines on the one hand and a large number of card providers and a large number of payment settlement systems on the other hand, with a central server which manages and controls the individual transactions have become established as the typical architecture for cashless payment transactions.

Here the fact that data records which contain confidential data strings, such as for example card or account numbers, also abbreviated in the following application to PANs (Primary Account Numbers), have to be not only conveyed but also processed and stored has proved to be a challenge. In particular, the PANs stored and being processed on the server must be protected so that they cannot be accessed and seen by third parties in order to prevent abuse of the payment system.

For the protected processing and storage of data records which contain PANs, methods have been developed for replacing the PANs received in plain text by placeholders uniquely assigned to the PANs, for example random tokens. Since, for example, the tables with the assignment between the replaced PANs and the placeholders are securely stored separately from the processing programs, there is no possibility for a third party to deduce the associated PANs from the data records being processed, which are pseudonymized with the aid of the placeholders.

Sensitive data strings such as PANs can pass through various systems of a company and, depending on the application, also be stored. In addition, systems/data are increasingly being transferred to the cloud.

There is therefore a need for a central system for replacing a data string by a placeholder for a whole company which enables all applications to be protected and, when necessary, to have controlled access to sensitive data strings. It is necessary to make possible a central administration, but at the same time to offer application-related access points throughout the company without long network communication paths.

It is furthermore necessary to address security problems in "untrusted" cloud environments, for example in the case of an external service provider. Further requirements are simple scaling in the case of an increasing number of replacements as well as safeguarding against failure, even in the case of the failure of individual servers on which the replacement device is executed.

At least one of the above-named objects is achieved by a computer-implemented method for replacing a data string by a placeholder in a replacement device, wherein the replacement device comprises a plurality of nodes of a distributed system carrying out the replacement, a management device connected to the nodes stores all the configuration data of the nodes necessary for the initialization of the nodes, at least one node is initialized centrally with the configuration data provided by the management device and the nodes do not permanently store the configuration data so that all the configuration data previously present on the node are deleted in the case of a shutdown or a failure of a node, with the steps reception of the data string from an application, selection of at least one node carrying out the replacement from the plurality of nodes of the distributed system, onward transmission of the data string to the at least one selected node, generation of a placeholder replacing the data string in the at least one selected node and passing the placeholder to the application.

In the context of the present application, by a replacement device is meant a device, but in particular a program or a program section, which carries out the generation of the placeholder from the data string as well as the reconstitution of the data string.

In the context of the present application, an application is any device, but in particular a program or a program section, which preferably processes a data record and, for example, performs a replacement of the data string by the placeholder in it and vice versa.

In one embodiment of the invention, the replacement of the data string by the placeholder is irreversible. In such an embodiment, it is not possible to reconstitute the original data string from the placeholder, but for some application scenarios it is not even necessary.

In contrast, in an alternative embodiment, the method for replacing the data string is reversible and, for reconstitution of the data string from the placeholder in the replacement device, the method has the steps reception of the placeholder from the application, selection of at least one node carrying out the reconstitution from the plurality of nodes of the distributed system, onward transmission of the placeholder to the at least one selected node, generation of the data string to be reconstituted for the placeholder in the at least one selected node and passing the data string to the application.

While all steps which serve for the generation of the placeholder and thus the replacement of the data string by the placeholder and, when necessary, inversely for the reconstitution of the data string from the placeholder take place in the at least one selected node, the other method steps, for example the passing of the placeholder to the application as well as the selection of the executing node can also be undertaken by other components or elements of the system.

In one embodiment of the invention, the nodes are virtual data processing devices. In one embodiment, these can be distributed over a plurality of physical servers.

In one embodiment, the nodes are virtual data processing devices which do not access persistent memories. In the case of a crash or a shutdown, the nodes thereby leave no traces or data at all behind and thus increase the security of the method according to the invention. In the context of the present application, data memories are referred to as persistent memories if their stored information is retained permanently, therefore also while the computer is not operational or is not supplied with power.

In one embodiment, the nodes and/or the management device are executed on hardware designed exclusively for this purpose. Execution on specialized hardware on the one hand increases security and on the other hand reduces the installation work for a user.

In a further embodiment, when a node is shut down, all the data previously present on the node are deleted.

According to the invention, the management device serves at least for the provision of configuration data necessary for the initialization of at least one node. In one embodiment of the invention, to initialize the nodes from a state in which all nodes are shut down, the management device provides all the configuration data necessary for the initialization to at least one node.

The configuration data do not therefore need to be stored in the individual nodes. This enables a spatial separation between the nodes and the management device, in particular an arrangement of the nodes in the cloud of a service provider, while the configuration data are stored exclusively in the management device of the company operating the application.

In one embodiment, the configuration data also comprise the secret data which define the algorithm for the replacement of the data string by the placeholder and optionally for the reconstitution of the data string.

The nodes are managed centrally by the management device. In one embodiment, the management device is also a virtual processing device, which is expediently distributed over a plurality of physical servers.

In one embodiment, the nodes of the distributed system are set up such that, in a state in which at least one node is not initialized and at least one node is initialized, the at least one initialized node initializes the at least one non-initialized node when booting up. As long as at least one node is ready for operation, i.e. initialized, the nodes are self-initializing. In this way, during operation of the nodes, it is not necessary for the management device to engage to initialize individual nodes. The management device can be switched off or the connection between the management device and the nodes can be interrupted.

In one embodiment of the invention, the replacement device comprises a monitoring device, wherein the management device provides the configuration data for the nodes to at least one monitoring device, which initializes the non-initialized nodes when booting up, with the result that the management device can be switched off.

In one embodiment, the monitoring device does not permanently store the configuration data so that all the configuration data previously present on the monitoring device are deleted in the case of a shutdown or a failure of the monitoring device. In this case, the configuration data have to be provided to the monitoring device again by the management device.

In one embodiment of the invention, the monitoring device is a virtual data processing device which does not access persistent memories.

In one embodiment of the invention, the application is connected to the nodes via a switching device, wherein the switching device manages one or more network connection(s) to one or more nodes. In this embodiment, the switching device makes the selection via those nodes which are carrying out the replacement.

In a further embodiment, several replacements are carried out for one application at the same time on several nodes.

In one embodiment, in the case of the failure of one node, the replacement is automatically carried out on one or more of the remaining nodes.

In one embodiment of the invention, an accounting device is provided which determines the number of data strings received by the application and/or the number of placeholders received by the application. In this way it is possible to account for the services "replacement" and/or "reconstitution" as a function of the replacements or reconstitutions performed. It is understood that, in the case of this embodiment, it is particularly useful to determine how often an application, in one embodiment a plurality of applications of a plurality of clients, accesses the method according to the invention according to an embodiment of the present invention.

In one embodiment of the invention, statistical methods are used to determine the quantities, in order to estimate the number of different data strings which have been replaced or reconstituted.

In one embodiment of the invention, the application is connected to the switching device via a network connection, in particular an internet connection, and via the switching device to the nodes or is connected directly to the nodes.

In a further embodiment, the network connection between the application and the nodes is secured by a protocol, which protects the integrity of the data and/or enables secure authentication at least on the server side and/or protects against unauthorized reading. One protocol which meets these requirements is, for example, SSH.

In a further embodiment, the nodes are connected to the management device and optionally in addition to an accounting device via a network connection, in particular via an internet connection.

In one embodiment of the invention, at least one component of the replacement device, in particular the nodes, the management device, the switching device and/or the monitoring device, is executed in a cloud environment.

In one embodiment of the invention, the nodes, the switching device and/or an intercept device authenticate the particular application and/or a user of the particular application which allows a replacement to be carried out.

In one embodiment of the invention, the nodes, the switching device and/or an intercept device verify an authorization of the application and/or of a user of the application to allow replacements to be carried out.

In the context of the present application, by a data string is meant any type of character string. A data record is composed of one or more such data strings. Here, the data strings in a data record can be separated from each other or marked in some other way, but they do not have to be. In particular, a data record can consist of a single character string which comprises a plurality of data strings. In the context of the present invention, one form of a data record is a message which comprises the original data string or the placeholder.

In one embodiment, a data record can be a message which describes a financial transaction, wherein the message contains, for example, information about the location, item and price of the transaction.

In a further embodiment of the invention, the data string to be replaced is at least one part of an account number or of a card number. Here, the replacement of a card or account number as data string by a pseudonymized placeholder serves only to give an example. In principle, however, replacement processes are suitable for all applications in which certain data, in particular personal details or personal data, need to be anonymized.

In the further embodiment of the invention, the method is carried out on a server for a cashless payment system.

The method according to the invention also differs from the methods from the state of the art at least in one embodiment in that, after initializing the at least one node, there is no further interaction with the management device. In particular, for the generation of the placeholder replacing the data string, there is no interaction with the management device. This means that no further information, going beyond the initialization, is conveyed to the respective node for the generation of the placeholder. In contrast to this, tokenization methods from the state of the art with a plurality of tokenization servers (these could be referred to as nodes) have a central replacement table (database) on a dedicated server, which all tokenization servers access in the case of each replacement. Moreover, in the state of the art there are tokenization methods in which a copy of the replacement table is permanently stored on each tokenization server, wherein the tokenization servers keep the replacement table synchronized.

In at least one embodiment, the generation of the placeholder replacing the data string and, when necessary, the generation of the data string to be reconstituted for the placeholder in the selected node always requires at least one calculation step in each case, which is carried out in the respective node. This calculation step uses a replacement secret conveyed during the initialization of the at least one node by the management device to the nodes in the form of the configuration data. By the replacement secret is meant a secret item of information which forms the basis for the calculation of the placeholder or of the data string to be reconstituted. Examples of the replacement secret, as are described in detail below, are a table with random values or a cryptographic key.

Examples of the generation of the placeholder or of the data string to be reconstituted are now described below.

In one embodiment of the invention, for the generation of the placeholder assigned to the data string to be replaced and replacing the latter, a placeholder is generated from the data string which is an encrypted representation of the original data string.

In an alternative embodiment, the generation according to the invention of a placeholder assigned to the data string and replacing the latter is based on tokenization of the data string, wherein the data string is replaced by a token as placeholder.

Essential requirements of a reversible tokenization are the reversibility of the method, i.e. each token must be able to be mapped unambiguously back onto the original data string, and the retention of the format of the tokenization in order to be able to process further, in particular store, the data record, in which a data string has been replaced by a token.

In one embodiment of the invention, the tokens are generated randomly in advance as placeholders and an assignment between each replaced data string and the respective replacing token is stored in a table.

Since the table with the assignment between the replaced data strings and the replacing tokens is stored securely by the nodes there is no possibility for a third party to deduce the associated data strings from the data records being processed, which are pseudonymized with the aid of the tokens.

Alternatively, the tokenization can also perform the replacement through a bijective mathematical function, which is applied to the replacing data string to be encrypted and which provides a unique mapping of the unencrypted data string onto the token placeholder and of the token placeholder onto the unencrypted data string.

A further tokenization method for the generation of placeholders is also known from European patent EP 2 735 991 B1. In this method, the token replacing the original data string is generated firstly by random characters stored in a lookup table or replacement table, but secondly by a function which is applied to the data string to be replaced itself and in the result then refers to the replacing characters.

Here, a mathematical function applied to the original data string is used to calculate an index, which determines the particular entry of the replacement table that is to be used next to replace a part of the unencrypted data string.

In this embodiment, the generation of the token from the unencrypted data string is effected partly in that an index of the replacement table is generated mathematically from the unencrypted data string itself, but the individual characters of the unencrypted data string are replaced by random replacement values which are derived from the replacement table.

This generation of the token is based on an unbalanced Feistel network, in which, to generate the token, the data string is first split into two part strings. The first part string consists of a single character of the unencrypted string and the second part string consists of the remaining characters of the unencrypted data string. The term "character" is understood in its broadest sense by a person skilled in the art. In particular, the single character of the first part string can comprise several elements of the underlying set of characters or alphabet, wherein these several elements are processed like a single character for the replacement.

An embodiment of the invention is even preferred in which the number of elements of the unencrypted data string which form the single character of the first part string is greater than one.

In particular, this tokenization method makes it superfluous to write the replaced unencrypted data string into the replacement table as the reconstitution can be effected exclusively with the aid of the token, the calculation of the index of the replacement table and the corresponding entry of the replacement table. In this way, the replacement table can be generated completely beforehand and distributed on back-up systems, for example. Synchronization between identical replacement tables held in different systems at a later point in time is not necessary. Collisions are inherently avoided.

The reconstitution of an unencrypted original data string from the token requires, however, that the token can be assigned to a data string in some way.

In one embodiment, when the token is generated, the replacement character is calculated from the entry of the replacement table determined by the index and the character to be replaced, and when the unencrypted data string is reconstituted, the replacement character is calculated from the entry determined by the index and the character to be replaced.

In such an embodiment of the method, it is expedient if the computing operations for calculating the replacement character, when generating the token and when reconstituting the unencrypted data string, are mutually inverse mathematical operations, in particular addition and subtraction or multiplication and division.

In one embodiment of the invention, the size of the alphabet used for the data string to be replaced is the same as the size of the alphabet of which the replacement characters consist.

In order to guarantee adequate security, it is advantageous if the number of repetitions of the method steps, when generating the token and when reconstituting the unencrypted data string, is at least $n+1$, but preferably $2n$, wherein n is the length of the data string to be replaced divided by the number of elements of the data string replaced in each replacement procedure.

In one embodiment of the invention, the calculation of the index of the replacement table, when generating the token or reconstituting the unencrypted data string from a token, comprises the following steps: calculation of a hash value by applying a hash function to a binary input which comprises the first part string of the data string and determination of the x most significant bits of the hash value as index of the replacement value to be used, wherein x is the number of bits required to provide all the entries of the replacement table with a unique index. When truncated to x bits, the replacement table can have $2^x$ entries, all of which are provided with a unique index which can be represented by the x bits.

In one embodiment of the invention, the binary input to which the hash value is applied additionally comprises a binary string (salt) of length s and/or the order of the repetition. Here, by the order of the repetition is meant the number of repetitions of the method steps for replacement of the individual characters of the data string including the current repetition round.

In one embodiment of the invention, the binary string (salt) comprises a not-to-be-encrypted part string of the data string to be encrypted and/or an arbitrarily chosen string. In particular, the binary string (salt) can be composed of a combination of strings in order to increase the security of the system.

The security of the method used can be increased with the aid of such a binary string denoted here as salt, which can be employed for the calculation of the index for the replacement values to be used. If an arbitrarily chosen string is used as the binary string, its value can either be fixed arbitrarily by the administrator of the tokenization device or also be, for example, a fixed component of the code for the tokenization device. In one embodiment of the invention, the binary string for the calculation of the index is a not-to-be-encrypted part string of an unencrypted data string, for example a PAN.

In one embodiment, an intercept device is further provided on a data channel, which, for a data record conveyed in a first direction, carries out the steps
  a. Interception of the data record conveyed over the data channel in the first direction,
  b. Identification of the data string to be replaced in the intercepted data record,
  c. Onward transmission of the data string to be replaced to at least one of the nodes of the replacement device for determination of a placeholder replacing the data string,
  d. Reception of the placeholder replacing the data string by the at least one node,
  e. Exchanging the data string in the data record for the placeholder,
  f. Onward transmission of the data record with the placeholder over the data channel in the first direction, and
wherein, for a data record conveyed in a second direction, the intercept device carries out the steps
  g. interception of the data record conveyed over the data channel in the second direction,
  h. Identification of a placeholder in the intercepted data record,
  i. Onward transmission of the placeholder to at least one of the nodes of the replacement device for reconstitution of the data string replaced by the placeholder,
  j. Reception of the data string replaced by the placeholders by the at least one node of the replacement device,
  k. Exchanging the placeholder in the data record for the data string and
  l. Onward transmission of the data record with the data string over the data channel.

The idea of such an intercept device is to monitor the input/output channel of a further application for processing the data record, i.e. an application, and, without interfering in the other devices of the system, to replace unencrypted security-relevant data strings by placeholders in all the data records which contain these data strings.

The data records modified in this way by the intercept device and from which the data string can no longer be derived are then processed further by a further application, wherein this replacement of the unencrypted data string by the placeholder results in no change at all in the processing since the placeholder preferably replaces the data string with the format retained.

In one embodiment, the intercept device is the application or part of one.

In particular, in one embodiment the data record with the placeholder is stored in a further application. In a server for a cashless payment system, this further device is a transaction data store, for example.

In one embodiment of the invention, the identification of the data string to be replaced or of the placeholder in a data record comprises determination of the length and the position of the data string or of the placeholder in the data record.

For this, in one embodiment it can be provided that the data record has an identification field, which contains information about the position of the data string to be replaced in the data record, wherein, to determine the position of the data string or of the placeholder in the data record, the identification field is read out.

In particular, when the data record comprises no such identification field, it is expedient if the data string to be replaced has a uniquely identifiable pattern or structure, wherein, to determine the position of the data string to be replaced or of the placeholder in the data record, a comparison of all the strings contained in the data record with a stored uniquely identifiable pattern is effected. It is understood that the data strings to be replaced can also have one of a plurality of patterns, wherein all the strings contained in the data record are then compared with a plurality of stored uniquely identifiable patterns.

In one embodiment of the invention, when the data string to be replaced occurs at a plurality of positions in the data record, it is replaced at all the positions by the placeholder.

If, for example, the complete data of a transaction including the unencrypted data string are now to be conveyed to another device in the system, the placeholder stored together with the indicated transaction number is identified in the memory and the original data string is then reconstituted from the placeholder using the previously described method according to the invention.

Insofar as the above-described embodiments of the method according to the invention can be realized at least partially using a software-controlled data processing device, it is obvious that a computer program which provides such software control and a storage medium on which such a computer program is stored are to be considered as aspects of the invention.

Further advantages, features and possible applications of the present invention become clear with reference to the following description of an embodiment and the associated figures.

Figure 6:
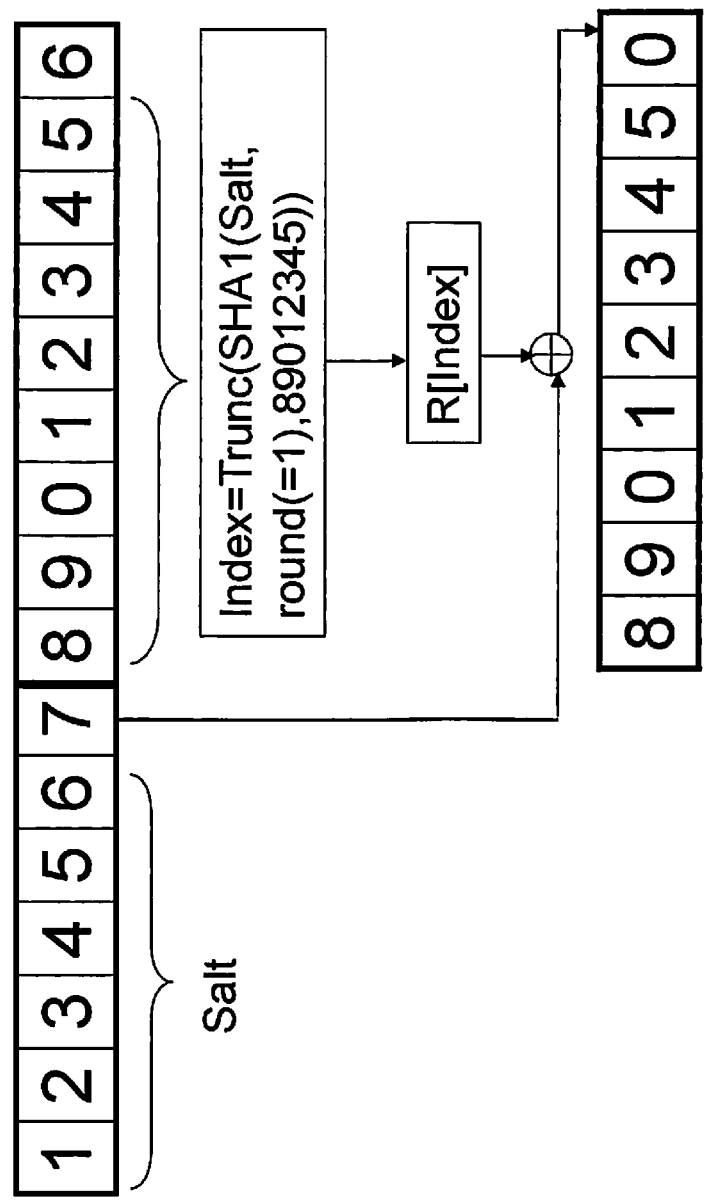

FIG. 6 explains schematically the generation of the index of the replacement table according to an embodiment of the method according to the invention.

In the figures, identical elements are labelled with the same reference numbers.

Figure 1:
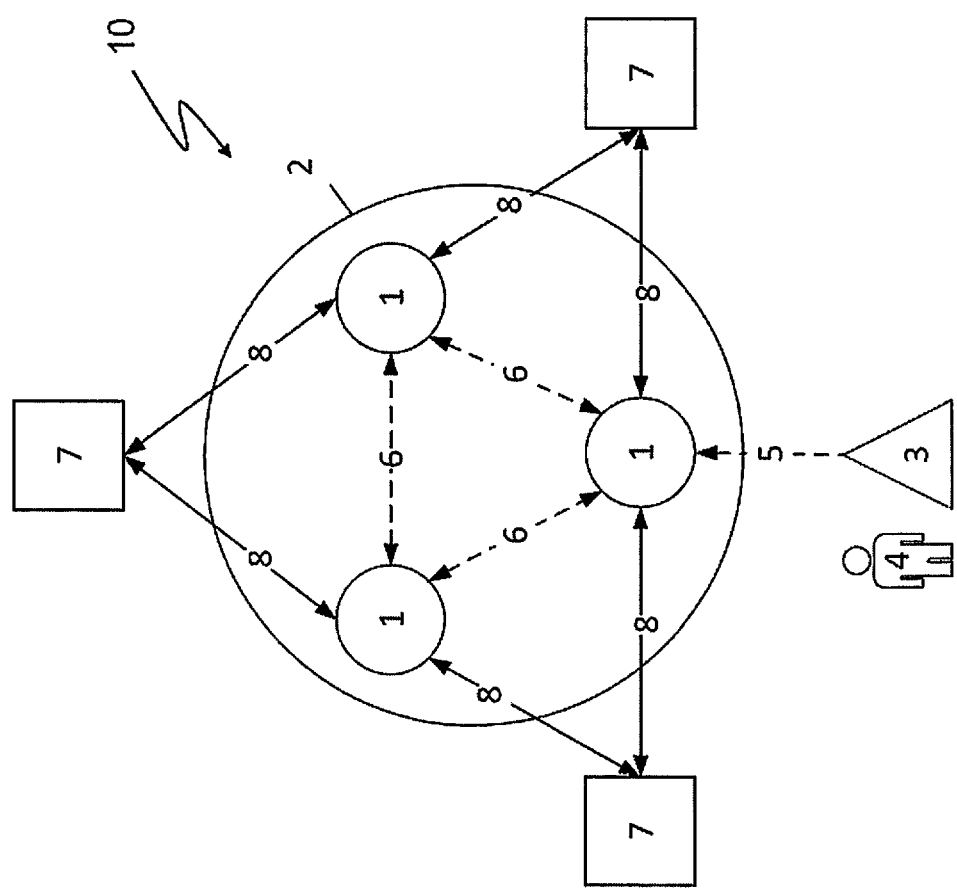
FIG. 1 is a schematic representation of an architecture for realizing an embodiment of the method according to the invention.

FIG. 1 shows schematically an architecture for realizing an embodiment of the method according to the invention for replacing a data string by a placeholder.

In the embodiment represented, the tokenization device 10 comprises three nodes 1, which carry out the tokenization, i.e. the generation of a placeholder from a data string, as well as the reconstitution of the unencrypted data string, a management device 3 and an accounting device (not represented in the figures).

The nodes 1 are virtual data processing devices in a cluster 2, the operation of which is distributed over a plurality of physical servers. The nodes do not access persistent memories. In the case of a crash or a shutdown they thereby leave no traces or data at all behind and thus increase the security of the method according to the invention.

The nodes 1 are managed centrally by an administrator 4 via the management device 3. The management device 3 is also a virtual data processing device, the operation of which is distributed over a plurality of physical servers.

All the configuration data necessary for the initialization of the nodes 1, including the required keys, are stored in the management device 3.

To boot up the nodes 1 from a state in which all the nodes 1 are shut down, the management device 3 loads all the configuration data for initializing the nodes 1 onto one of the nodes 1 via a network connection 5. Moreover, the cluster 2 is self-initializing: in a state in which at least one node 1 is already or still booted up, this one booted-up node 1 or the plurality of booted-up nodes 1 can initialize the shut-down nodes 1 when booting up via the data connections labelled 8 in FIG. 1. In this way, it is not necessary for the management device 3 to interfere with the cluster 2 while the nodes 1 are operating. After a node 1 has been initialized, the connection 5 between the management device 3 and the nodes 1 can be broken or interrupted.

An accounting device (not represented in the figures) determines the number of unencrypted data strings transmitted onward to the nodes 1 by one or a plurality of applications 7 via network connections 8. In this way it is possible to account for the services provided as a function of the replacements actually carried out.

The unencrypted data string is received by the nodes 1 in the cluster 2 and replaced by a token. The token is then passed to the application 7 again. The application 7 then replaces the unencrypted data string by the token in the data record and further processes the secure data record amended in this way or transmits it onward for further processing.

Figure 2:
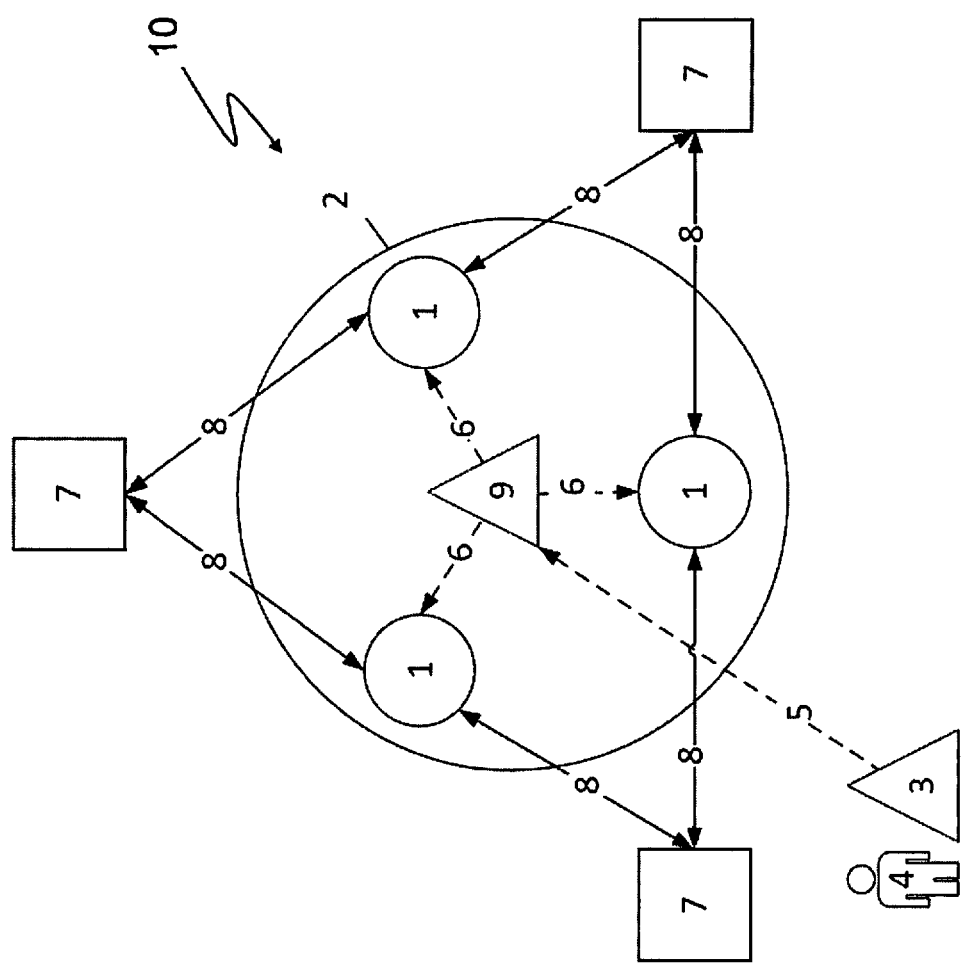
FIG. 2 is a schematic representation of a further architecture for realizing a further embodiment of the method according to the invention.

The embodiment from FIG. 2 differs from the variant from FIG. 1 in that it additionally has a monitoring device 9. The management device 3 is connected to the monitoring device 9 via the network connection 5.

To initialize the nodes, the management device 3 provides the configuration data for the nodes 1 to the monitoring device 9, which then initializes the non-initialized nodes 1 during booting up and monitors the functioning of the nodes 1. After the monitoring device 9 has been initialized for the first time, the management device 3 can therefore be switched off.

The monitoring device 9 does not permanently store the configuration data either, with the result that all the configuration data previously present on the monitoring device 9 are deleted in the case of a shutdown or a failure of the monitoring device 9. In this case, the configuration data have to be provided to the monitoring device 9 again by the management device 3.

Figure 3:
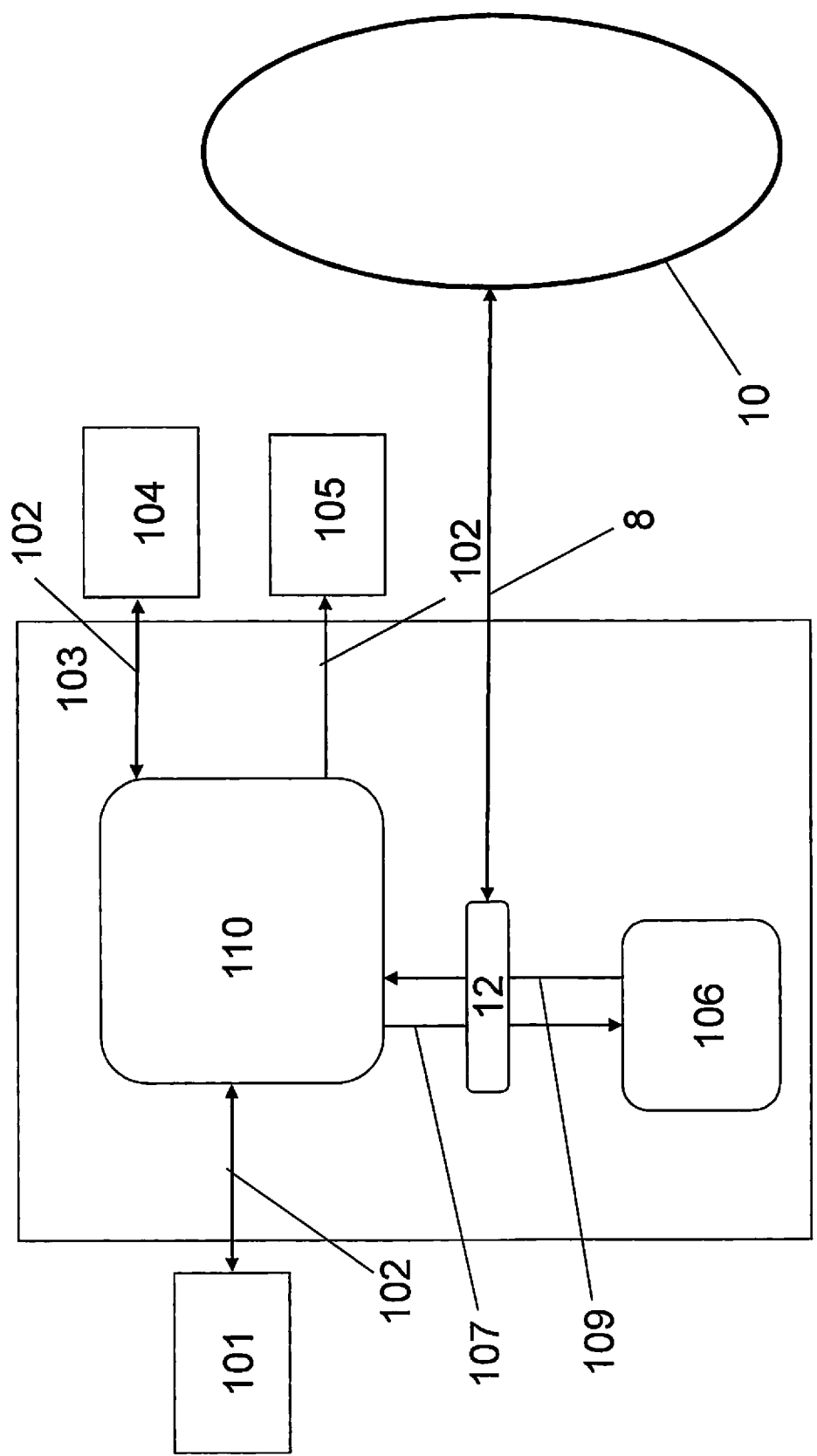
FIG. 3 shows schematically a payment processing system with secure processing of PANs according to the invention.

FIG. 3 is a schematic representation of a payment processing system, in which the method according to the invention for the secure storage of a data string is used.

The payment processing system shown consists of a plurality of check-out systems 101, one of which is represented in FIG. 3. The check-out system 101 is connected to a central server 103 via a network connection 102. This server in turn is connected via network connections 102 to both credit card providers 104 and to the actual payment settlement system(s) 105.

In the embodiment shown, the server 103 in turn has a central processing unit 110, an intercept device 12 and a transaction data store 106.

The server 103 receives information about the transaction to be made from the check-out systems 101 via the network connection 102. This information comprises in particular the (credit) card number of the purchaser as well as details of the price, the time of completion of the purchase and the like. The information about a transaction is present in the form of a message which is transmitted from and to the server 103 via the network connections 102. Such a message is a data record in the context of the present application. The information about the transaction being made can firstly be transmitted onward directly, i.e. without intermediate storage, to the credit card provider 104 or the payment settlement system 105 by the central processing unit 110 on the server 103. Here, the onward transmission is effected, from the point of view of the system implemented on the server 103, in plain text, i.e. unencrypted. However, this only means that the server 103 itself performs no encryption for this transmission. Instead, the channels 102 from and to the server 103 are protected by systems proprietary to them. For example, the networks 102 are designed as VPN channels.

The task of the central processing unit 110 implemented on the server 103, due to its high availability, is to process the transaction information and, when necessary, to store it until the corresponding devices of the credit card providers 104 and systems 105 are available again. In addition, the transaction information is usually stored for later processing of claims and for accumulated onward transmission to the payment settlement systems 105.

In order to guarantee the maximum possible security of the transaction data during handling in the server 103, all the PANs contained in the transaction data, which here form the data strings to be replaced in the context of the present application, are replaced by tokens as placeholders before the data are stored in the transaction data store 106. For this, both the input path 107 into the transaction data store 106 and the output data path 109 from the transaction data store 106 are monitored by the intercept device 12.

In the embodiment represented, the intercept device 12 is logically part of the tokenization device 10 but is implemented in the application environment. The central processing device 110, and the software operating on it, and the transaction data store 106 form applications for processing the data record in the context of the present application.

All the data records to be stored on the input data path 107, which contain a PAN, i.e. a security-relevant data string, are intercepted by the intercept device 12. The data record is analysed and the unencrypted data string contained therein is passed to the tokenization device 10 (also referred to as tokenization engine) as replacement device in the context of the present application.

In the embodiment represented, the cluster 2 with the nodes is realized in a cloud. The connection between the intercept device 12 and the cloud of the tokenization device 10 is therefore an internet connection 8. The structure of the tokenization device 10 is alternatively the same as represented in FIG. 1 or 2.

The unencrypted data string is received by the nodes of the cluster 2 and replaced by a token. The token is then passed to the intercept device 12 again. The intercept device 12 then replaces the unencrypted data string by the token in the intercepted data record and outputs the secure data record amended in this way to the transaction data store 106 for storage of the data record.

If, conversely, a data record is to be read out from the transaction data store 106 and provided to the central processing unit 110, first the token of the data record stored in the transaction data store must be replaced again by the unencrypted data string.

For this, all the data records read out from the transaction data store on the output data path 109 are intercepted by the intercept device 12. Each data record is analysed and the token contained therein is passed to the nodes of the tokenization device 10. The token is received by nodes and exchanged again for the associated unencrypted data string. The unencrypted data string is then passed to the intercept device 12 again. The intercept device 12 then replaces the token in the intercepted data record read out from the transaction data store 106 by the unencrypted data string and outputs the data record amended in this way to the central processing unit 110 for further processing of the data record. Such further processing comprises, in particular, routing of a message with the data record to a card provider 104 or a payment settlement system 105.

It has proved advantageous with this architecture that the PANs for the individual transactions are not present in the transaction data store 106 as plain text but are pseudonymized by tokens, i.e. randomly determined synonyms. Therefore, an attack on the transaction data store 106 never yields information about the PANs, with the result that such an attack remains ineffective.

In order to guarantee the maximum possible security, the nodes 1 and the management device 3 with the stored index function and replacement table are implemented separately from each other.

It is explained below, with reference to FIGS. 4 to 6, how the replacement of the PAN as security-relevant unencrypted data string is effected by the tokenization device 10 for a data record describing a transaction. It is also described how the token is translated by the security-relevant unencrypted data string assigned to it when the data record is to be output from the server 103.

Figure 4:
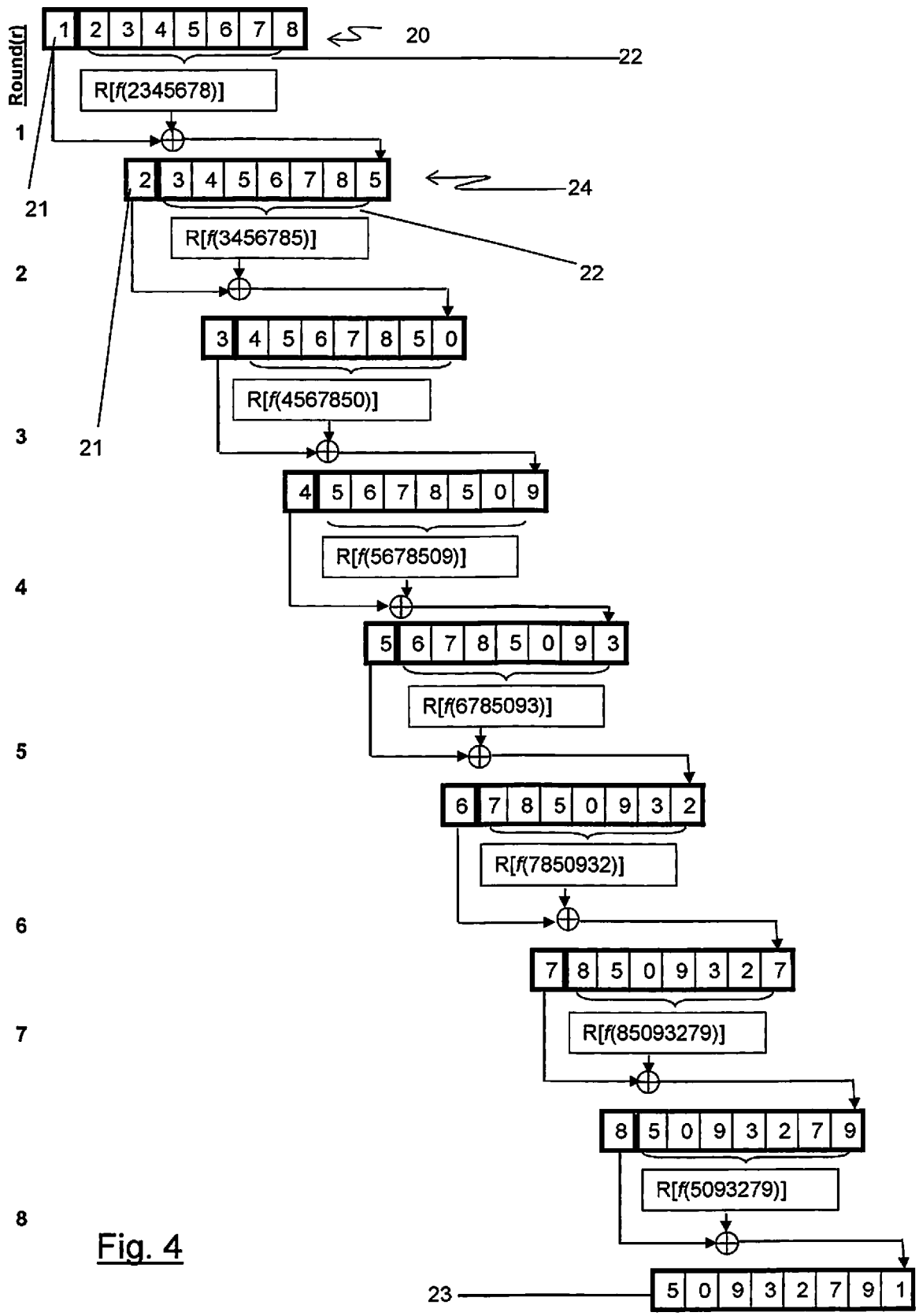
FIG. 4 shows the tokenization of a data string according to an embodiment of the method according to the invention by means of a flow diagram.

The flow diagram from FIG. 4 shows schematically with reference to an example how an unencrypted data string 20, here a credit card number, with the exemplary character string "12345678" is replaced by a token with the character string "50932791". This replacement of the PAN by the token is effected in the tokenization engine shown in the figure with 8.

In order to replace all the characters of the original PAN as a data string to be encrypted, this process must be run through eight times, wherein the ordinal number for the corresponding round of the process can be seen on the left next to the flow diagram in FIG. 4. However, there is no harm if the process is run through more times in order to increase the security in the replacement of the data string by the token.

First, the unencrypted data string 20 with the named character string is split into two part strings 21, 22, wherein the first part string contains only the first character or element "1" of the data string to be encrypted, while the second part string contains all the further characters of the data string to be encrypted, namely "2345678". Now, the single character "1" in the first part string has to be replaced by a randomly chosen character from an alphabet with which the tokens are constructed.

Here, in the embodiment represented, the set of characters, i.e. the alphabet, from which the PAN is constructed as an unencrypted data string and the alphabet or the set of characters from which the tokens are constructed have the same number of characters.

Retaining the format, the token also has the same number of characters as the PAN assigned to this token.

In the example from FIG. 4, in the first round the character "1" from the part string must be replaced by only one character. The character of the token by which the single character of the first part string is replaced is contained in a table which, in the embodiment represented, contains at least eight randomly selected replacement characters which are stored in eight entries, in each case provided with an index, in the replacement table.

In order to determine which character of the replacement table is to replace the character contained in the first part string, a function is applied to the second part string which serves to determine the index of the particular entry of the replacement table, the replacement character of which is used to replace the single character of the first part string.

In the flow diagram represented in FIG. 4, to illustrate the actual formation of the token, R[x] denotes the entry of a replacement table R with the index x, wherein the index x is calculated with the aid of a function f, applied to the characters of the second part string, here "2345678".

In the chosen example, the character "1" of the first part string is replaced in round 1, i.e. the first repetition of the replacement process, by the character "5", i.e. the particular entry of the replacement table which has the index x=f (2345678).

The replacement character then forms the last character of the string 24 to be processed in the next round of the process. This string 24 is again split into two part strings 21, 22 in the second round. Of these part strings, the first 21 again contains only one character, namely the second character "2" of the original unencrypted string 20, and the second 22 contains the remaining characters "345678" of the original string 20 as well as, as the last character, the replacement character "5" from the first round.

In the example shown from FIG. 4, this procedure is repeated until all the characters of the original unencrypted data string have been replaced by random replacement characters from the replacement table. As the original data string 20 in the example shown has a length of eight characters, after eight runs through all the characters have been replaced and the complete token 23 formed. In order to increase the security further, the process should be continued for at least one further round. Here, in the embodiment represented, the number of runs through r is actually double the length n of the original unencrypted data string.

In the complete system, as shown in FIG. 3, the token 23 from FIG. 4 would now replace the original data string, i.e. the PAN 20, and the data record would be passed on by the tokenization engine 8 to the transaction data store 6, where it is no longer assignable to the PAN. Also, no direct assignment between token and PAN is stored in any place in the nodes 13. Instead, only the replacement table with its replacement values contained therein and the function f for calculating the index during the replacement are held in the nodes 13, but are not stored permanently there.

It is only when a data record is to be passed from the server 3 to one of the other components 1, 4, 5 of the system again that the token representing a pseudonym for the PAN in the data record is replaced again by the PAN in plain text. For this, the steps described for the replacement of the PAN by the token are run through in reverse order.

Figure 5:
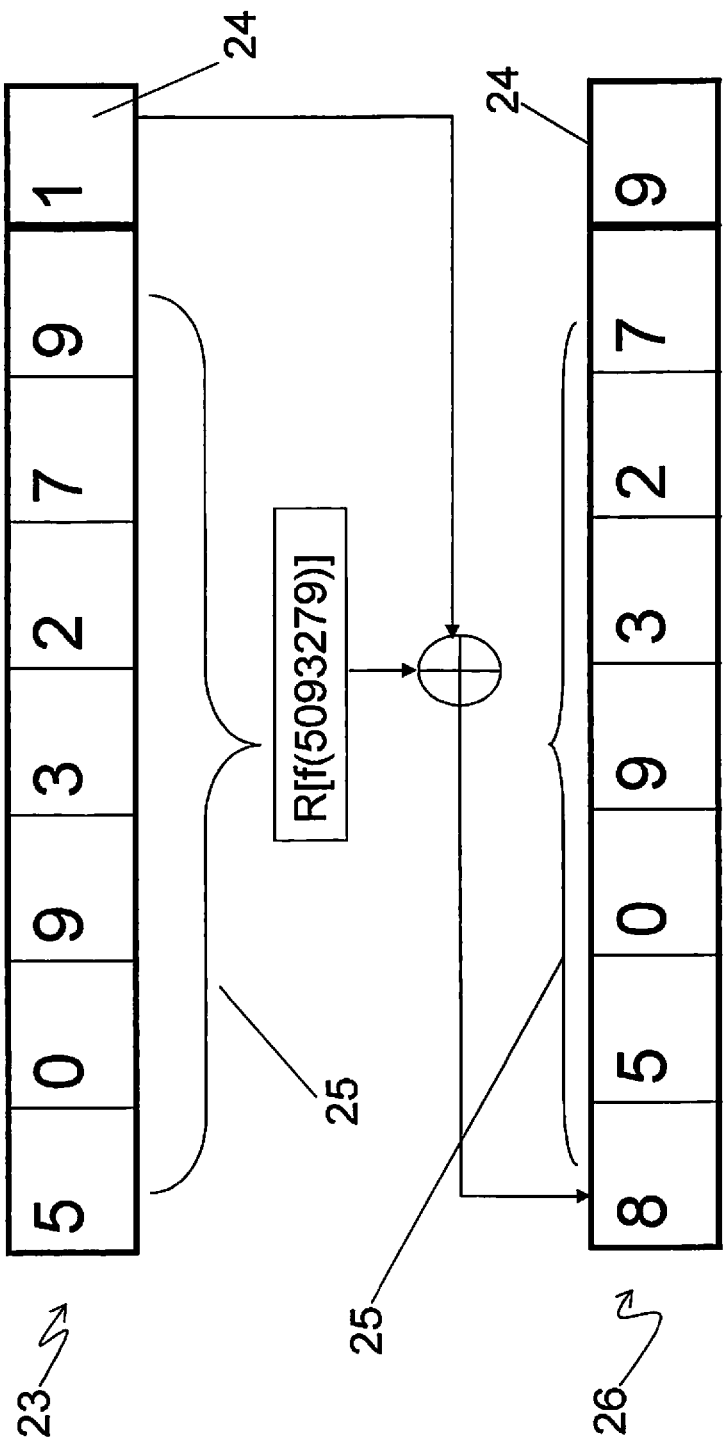
FIG. 5 shows a step of a flow diagram for the reconstitution of the unencrypted data string according to an embodiment of the method according to the invention.

By way of example, the first round for this is represented in FIG. 5. The token 23 is first divided into two part strings 25, 24, namely a first part string 25, which contains all but the last character of the token, and a second part string 24, which contains, as single character, the last character of the token, here the character "1". The single character of the second part string 24 is now replaced by the character of the original data string belonging to the index of the last replacement character.

To generate the corresponding index, the index function f is applied to the characters of the first part string 25. In the example represented, this means that the character "1" of the second part string 24 of the token 23 is replaced by the character "8" of the original PAN. This original character "8" then forms the first character of the string 26 to be processed in the next, i.e. second, round. This string 26 to be processed further is again split into a first part string 25 and a second part string 24, wherein the latter has only a single character, namely the last character of the string 26 to be processed further.

FIG. 6 shows by way of example how the index of a replacement character from the replacement table can be determined with the application of a function to the particular part string of the string to be replaced which contains more than one character (irrespective of the question of whether it is the process of tokenization or of reconstitution of the original data string from the token that is being considered).

In the embodiment represented, a hash function is applied to a string which is composed of a so-called salt, the round index round, in the present case round 1, and the characters of the particular part string which contains more than one character. In the chosen example, the hash function is the SHA-1 algorithm. The hash value generated in this way is truncated to the x most significant bits, wherein x denotes the number of bits necessary to index all the entries of the replacement table. This avoids the hash function calculating indices which do not exist in the replacement table actually stored. When truncated to x bits, the table can have $2^x$ entries, which can all be provided with a unique index.

The index calculated in this way is then used to determine the particular character which replaces the single character of the first part string in the example shown.

In order to guarantee that the process described here can be handled mathematically, in embodiments the unencrypted data string 20 is first converted into an internal representation of the tokenization engine. If $p[0] \ldots p[n-1]$ denote the individual characters of the unencrypted data string with their position within the string, then the internal representation of this string is $p_{int}[0] \ldots p_{int}[n-1]$, wherein $p_{int}[0]$ denotes the integral position of the character $p[0]$ within the alphabet A from which the unencrypted data string is constructed, and so on.

In this case, the following steps would have to be repeated r times, wherein i describes the number of the current round (starting with 1):

1. Calculate the hash value h with the SHA-1 hash algorithm, which uses as input a binary string formed by linking the salt, the number of the round i and the string $p_{int}[1] \ldots p_{int}[n-1]$.
2. Take k as the most significant 24 bits of h.
3. Define temp as $(p_{int}[0]+R[k])$ mod a, wherein R[k] is the entry of the replacement table R with the index k and a is the size of the alphabets of the unencrypted data strings and the tokens.
4. Form $p_{int}[j]=p_{int}[j+1]$ for $0 \leq j \leq n-2$ and $p_{int}[n-1]=\text{temp}$.
5. Increase i by 1.

After repeating steps 1 to 5 r times, the string $f[0] \ldots f[n-1]$ is output as the external representation of $p_{int}[0] \ldots p_{int}[n-1]$, wherein $t[0]=A[p_{int}[0]]$, and so on.

The reverse process, which generates the original unencrypted data string 20 from the token 23, then works as follows:

Apply the steps represented below r times to the internal representation $t_{int}[0] \ldots t_{int}[n-1]$ of the token $t[0] \ldots t[n-1]$, wherein i denotes the number of the current round (starting from r):

1. Calculate the hash value h with the SHA-1 hash algorithm, which uses as input a binary string formed by linking the salt, the number of the round i and the string $t_{int}[1] \ldots t_{int}[n-1]$.
2. Take k as the most significant 24 bits of h.
3. Define temp as $t_{int}[n-1]-R[k]$, wherein R[k] is the entry of the replacement table R with the index k.
4. If temp>0, then form temp=temp+a, wherein a is the size of the alphabets of the unencrypted data strings and the tokens.
5. Form $t_{int}=p_{int}[j-1]$ for $1 \leq j \leq n-1$ and $t_{int}[0]=\text{temp}$.
6. Increase i by 1.

After repeating steps 1 to 6 r times, the string $p[0] \ldots p[n-1]$ is output as the external representation of $t_{int}[0] \ldots t_{int}[n-1]$, wherein $p[0]=A[t_{int}[0]]$, and so on.

The operation used in this example for calculating the new character in steps 3 from the character to be replaced and the replacement characters from the replacement table avoids the need to write the replaced characters into the replacement table when generating the tokens, which in turn increases the security as no assignment between the characters of the original data string and the characters of the token is possible in any place, that is even in the secure token store.

For the purposes of the original disclosure, it is pointed out that all the features, as revealed in the present description, the drawings and the claims to a person skilled in the art, even when they have only been described in concrete terms in connection with certain further features, can be combined both individually and in any combinations, with others of the features or groups of features disclosed here, insofar as this has not been expressly ruled out or technical circumstances make such combinations impossible or pointless. Comprehensive explicit representation of all conceivable combinations of features is dispensed with here solely for the sake of brevity and legibility of the description.

While the invention has been represented and described in detail in the drawings and the preceding description, this representation and description is only by way of example and is not intended as a limitation of the scope of protection, as defined by the claims. The invention is not limited to the disclosed embodiments.

Modifications of the disclosed embodiments are obvious to a person skilled in the art from the drawings, the description and the attached claims. In the claims, the word "have" does not exclude other elements or steps and the indefinite article "a" or "an" does not exclude a plurality. The mere fact that certain features are claimed in different claims does not exclude the combination thereof. Reference numbers in the claims are not intended as a limitation of the scope of protection.

LIST OF REFERENCE NUMBERS 1 node
2 cluster
3 management device
4 administrator
5, 6, 8 network connection
7 application
9 monitoring device
10 tokenization device
12 intercept device
20 unencrypted data string
21 first part string
22 second part string
23 token
24 string as intermediate stage
23 token
24 second part string
25 first part string
26 string as intermediate stage
101 check-out system
102 network connection
103 server
104 credit card provider
105 payment settlement system
106 transaction data store
107 input path
109 output data path
110 central processing unit of the server
111 internet connection

The invention claimed is:

1. A computer-implemented method for replacing a data string by a placeholder in replacement device, wherein
   the replacement device comprises a plurality of nodes of a distributed system carrying out the replacement,
   a management device connected to the nodes stores all configuration data of the nodes necessary for initialization of the nodes,
   at least one node is initialized centrally with the configuration data provided by the management device,
   the nodes do not permanently store the configuration data so that all the configuration data previously present on the node are deleted in case of a shutdown or a failure of a node,
the method including
   receiving the data string from an application,
   selecting at least one node carrying out the replacement from the plurality of nodes of the distributed system,
   transmitting the data string onward to the at least one selected node,
   generating a placeholder replacing the data string in the at least one selected node and
   passing the placeholder to the application, and
wherein at least, in a state in which at least one node is not initialized and at least one node is initialized,
   either the at least one initialized node initializes the at least one non-initialized node when booting up, with the result that the management device can be switched off or a connection between the management device and the nodes can be interrupted,
   or the management device provides configuration data for the nodes to at least one monitoring device, which initializes non-initialized nodes when booting up, with the result that the management device can be switched off or a connection at least between the management device and the nodes or between the management device and the monitoring device can be interrupted.

2. The computer-implemented method according to claim 1 for replacing the data string from the placeholder in the replacement device, furthermore including
   receiving the placeholder from the application,
   selecting at least one node carrying out the reconstitution from the plurality of nodes of the distributed system,
   transmitting the placeholder onward to the at least one selected node,
   generating the data string to be replaced for the placeholder in the at least one selected node and
   passing the data string to the application.

3. The computer-implemented method according to claim 1, wherein the nodes are virtual data processing devices which do not access persistent memories.

4. The computer-implemented method according to claim 1, wherein at least the nodes or the management device are executed on hardware designed exclusively for this purpose.

5. The computer-implemented method according to claim 1, wherein the application is connected to nodes via a switching device, wherein the switching device manages one or more network connections to one or more nodes.

6. The computer-implemented method according to claim 1, wherein several replacements are carried out for one application at the same time on several nodes.

7. The computer-implemented method according to claim 1, wherein, in case of a failure of one node, the replacement is automatically carried out on one or more of a plurality of remaining nodes.

8. The computer-implemented method according to claim 1, wherein a token is generated as the placeholder, wherein the generation of the token replacing the data string comprises
   providing a replacement table with random entries, wherein each entry is assigned an index of the replacement table,
      dividing an unencrypted data string into two part strings, wherein a first part string consists of one character of the unencrypted data string and a second part string consists of remaining characters of the unencrypted data string,
      calculating an index of the replacement table from the second part string so that an entry of the replacement table is determined,
      generating a replacement character from the entry determined by the index,
      replacing characters of the first part string by the replacement character,
      interchanging the first and the second part strings so that a replaced character of the first part string becomes a last character or a first character of the second part string and a first character or a last character of the second part string becomes the character of the first part string, and repeating all preceding steps so that a token assigned to the unencrypted data string is generated, and generating a data string to be reconstituted from the token comprising providing the replacement table, dividing the token into two part strings, wherein a first part string consists of all the characters except a last character of the token and the second part string consists solely of the last character of the token, calculating an index of the replacement table from the first part string so that a particular entry of the replacement table is determined, generating a replacement character from the entry of the replacement table determined by the index so that the character of the second part string is replaced by the replacement character, interchanging the first and the second part strings so that the character of the second part string becomes a first character or a last character of the first part string and a last character or a first character of the first part string becomes a character of the second part string, and repeating the preceding steps so that the unencrypted data string assigned to the token is reconstituted.

9. The computer-implemented method according to claim 1, wherein the application transmits, together with the data string, an additional value uniquely individualized to the data string to at least one node, wherein, for reconstitution of the data string from the placeholder, the same additional value is transmitted by the application together with the placeholder to the at least one node.

10. The computer-implemented method according to claim 1, wherein at least one component of a replacement device is executed in a cloud environment.

11. A method according to claim 1, wherein an intercept device is provided on a data channel, which, for a data record conveyed in a first direction, the method includes:
   a. intercepting the data record conveyed over the data channel in the first direction,
   b. identifying a data string to be replaced in the intercepted data record,
   c. transmitting the data string to be replaced onward to at least one of the nodes of the replacement device for determination of a placeholder replacing the data string,
   d. receiving the placeholder replacing the data string by the at least one node,
   e. exchanging the data string in the data record for the placeholder,
   f. transmitting the data record with the placeholder over the data channel in the first direction, and wherein, for a data record conveyed in a second direction, the intercept device carries out the steps
   g. intercepting a data record conveyed over the data channel in the second direction,
   h. identifying a placeholder in the intercepted data record,
   i. transmitting the placeholder onward to at least one of the nodes of the replacement device for reconstitution of the data string replaced by the placeholder,
   j. receiving the data string replaced by the placeholders by the at least one node of the replacement device,
   k. exchanging the placeholder in the data record for the data string and
   l. transmitting the data record with the data string onward over the data channel.

12. A non-transitory machine-readable data medium with a computer program stored thereon, which computer program comprises program code for performing the method according to claim 1.

13. A data processing device onto which a computer program is loaded, which computer program comprises code for performing the method according to claim 1.

* * * * *

UNITED STATES PATENT AND TRADEMARK OFFICE
CERTIFICATE OF CORRECTION

PATENT NO. : 10,929,151 B2
APPLICATION NO. : 16/158452
DATED : February 23, 2021
INVENTOR(S) : Horst et al.

It is certified that error appears in the above-identified patent and that said Letters Patent is hereby corrected as shown below:

In the Specification

Column 14, Lines 22-23, the equation should read as follows:
-- the string t[0] ... t[n-1] --

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*